United States Patent [19]

Tanaka

[11] Patent Number: 4,635,539
[45] Date of Patent: Jan. 13, 1987

[54] AUTOMATIC SKEWERED FOOD ROASTER

[75] Inventor: Akira Tanaka, Shizuoka, Japan

[73] Assignee: Forming Industry, Inc., Japan

[21] Appl. No.: 779,048

[22] Filed: Sep. 23, 1985

[30] Foreign Application Priority Data

Sep. 21, 1984 [JP] Japan .................. 59-198078

[51] Int. Cl.⁴ ............................................. A47J 37/04
[52] U.S. Cl. ................................ 99/421 H; 99/443 C; 99/447
[58] Field of Search ..................... 99/340, 420, 421 H, 99/443 C, 441, 447; 426/523

[56] References Cited

U.S. PATENT DOCUMENTS

| 1,771,762 | 7/1930 | Allwine | 99/441 X |
| 1,776,501 | 9/1930 | Grady | 99/441 X |
| 2,142,390 | 1/1939 | Zerr | 99/420 |
| 2,705,913 | 4/1955 | Bloom | 99/441 X |
| 4,034,661 | 7/1977 | Boosalis | 99/420 X |
| 4,440,071 | 4/1984 | Boosalis . | |

Primary Examiner—Billy J. Wilhite
Attorney, Agent, or Firm—Stevens, Davis, Miller & Mosher

[57] ABSTRACT

An improved automatic skewered food roaster is disclosed. The roaster disclosed herein is of the type including right and left heat sources vertically disposed in an opposite relation with respect to each other, and an endless chain for transferring skewered food spacedly secured thereon in the clockwise direction and in which the roasting is done while the skewered food is transferred from upward to downward by the endless chain. The improvement comprises right and left infrared heaters disposed in the place of the right and left heat sources; and right and left heat reserving plates spacedly disposed in an opposite relation with respect to each other in order to permit the skewered food to pass through the space. An opening adapted to serve as an inlet for the skewered food is defined by the heat reserving plates at their upper ends. A chamber is also defined by the heat reserving plates at their middle portions for serving as a heat storage for reflecting and storing heat ascending from the infrared heaters.

2 Claims, 6 Drawing Figures

AUTOMATIC SKEWERED FOOD ROASTER

BACKGROUND OF THE INVENTION

1. Field of the Invention

The present invention relates to a roaster for automatically roasting a wide variety of food including chicken, beef, pork, fish, shrimps, and vegetables secured on a spit or skewer.

2. Description of the Prior Art

Automatic roasters for skewered meat are known, wherein a number of spits or skewers secured with various kinds of raw meat are spacedly mounted on an endless chain moving through a space defined by facing heat sources to roast the skewered meat. Generally, there are two types of the conventional roasters. One type arranges the heat source horizontally while the other arranges the heat source vertically. An automatic skewered food roaster having vertical heat sources is disclosed, for example, in a Japanese Patent Publication (after examination) No. 54(1979)-6630, as well as a Japanese Utility Model Publication (after examination) No. 56(1981)-33476. The disclosed roasters, when compared with the horizontal style, have the advantages that (1) the meat juice is not dropped onto the heat source (2) and almost no smoke is produced while roasting, and (3) heat can be preliminarily applied to the skewered meat by utilizing ascending heat generated from the heat sources, before the skewered meat is carried into a space formed between the heat sources for roasting. At present, this vertical styled automatic skewered food roaster is widely used. In order to effectively preliminarily heat skewered meat by reserving the ascending heat in a vertical automatic skewered food roaster, Patent Publication No. 54(1979)-6630, teaches that a heat barrel containing right and left heat sources therein be formed at its upper portion with a hollow portion for permitting the skewered food to pass therethrough. On the other hand, in the skewered food roaster discussed in the Utility Model Publication No. 56(1981)-33476, a reflection plate formed in a shape of an inclining roof is disposed above the right and left heat source in order to increase the heat reserving effect.

However, the heat reserving means by forming the hollow portion has the disadvantage that the ascending heat is often dispersed within the hollow portion. That is, the ascending heat is suddenly dispersed from a discharge port formed at the top of the hollow portion. As a result, an insufficient heat reserving effect is obtained. Similarly, in the case of the above mentioned reflection plate formed in an inclining roof shape, since the ascending heat is suddenly raised due to the chimney effect of the inclining roof shaped reflection plate, only limited spaces at the upper ends of the reflection plates will form a temperature distribution suitable for the preheating, and a sufficiently high temperature suitable for the preheating can not be obtained in the area at the inside of the reflection plates. Because of the foregoing reasons, none of the conventional skewered food roasters described can sufficiently preheat the skewered food. Furthermore, since the conventional skewered food roasters employ a gas burner of a heat radiation type, considerable piping is required before use. It is not only a nuisance job to do the piping, but also there exists such a problem that the conventional skewered food roasters of the type just described are not always permitted to be used in all places since it would be unsafe.

The present invention was developed in order to overcome the problems inherent in the prior art devices.

SUMMARY OF THE INVENTION

It is therefore a general object of the present invention to provide an automatic skewered food roaster in which skewered food can be automatically roasted without losing its good taste and, which can be readily used almost in any place.

A specific object of the present invention is to provide an automatic skewered food roaster, in which skewered food fed by an endless chain is preheated at a high temperature for a comparatively long time by effectively reserving and utilizing and ascending heat from a heat source.

Another specific object of the invention is to provide an automatic skewered food roaster, in which an extremely easily usable infrared heater is used as a heat source.

In order to achieve the above objects, there is essentially provided an automatic skewered food roaster including right and left heat sources vertically disposed in an opposed relationship with respect to each other, and an endless chain for transferring skewered food spacedly secured thereon in a clockwise direction. The roasting is done while the skewered food is being passed downwardly between the heat sources by the endless chain. Facing right and left infrared heaters are disposed as said right and left heat sources. Right and left heat reserving plates are spacedly disposed in an opposed relationship with respect to each other in order to permit the skewered food to pass between the infrared heaters and the reserving plates. The heat reserving plates define an opening at the upper ends thereof. The opening serves as an inlet for the skewered food. The heat reserving plates also define a chamber at middle portions thereof. The chamber serves as a heat storage for reflecting and storing ascending heat from the infrared heaters.

The novel features which are considered characteristic of the present invention are set out in the appended claims. The invention itself, however, together with additional objects and advantages thereof will be best understood from the following detailed description taken in conjunction with the accompanying drawings which illustrate, by way of example only, a preferred embodiment of the present invention.

DETAILED DESCRIPTION OF THE EMBODIMENTS

Figure 1:
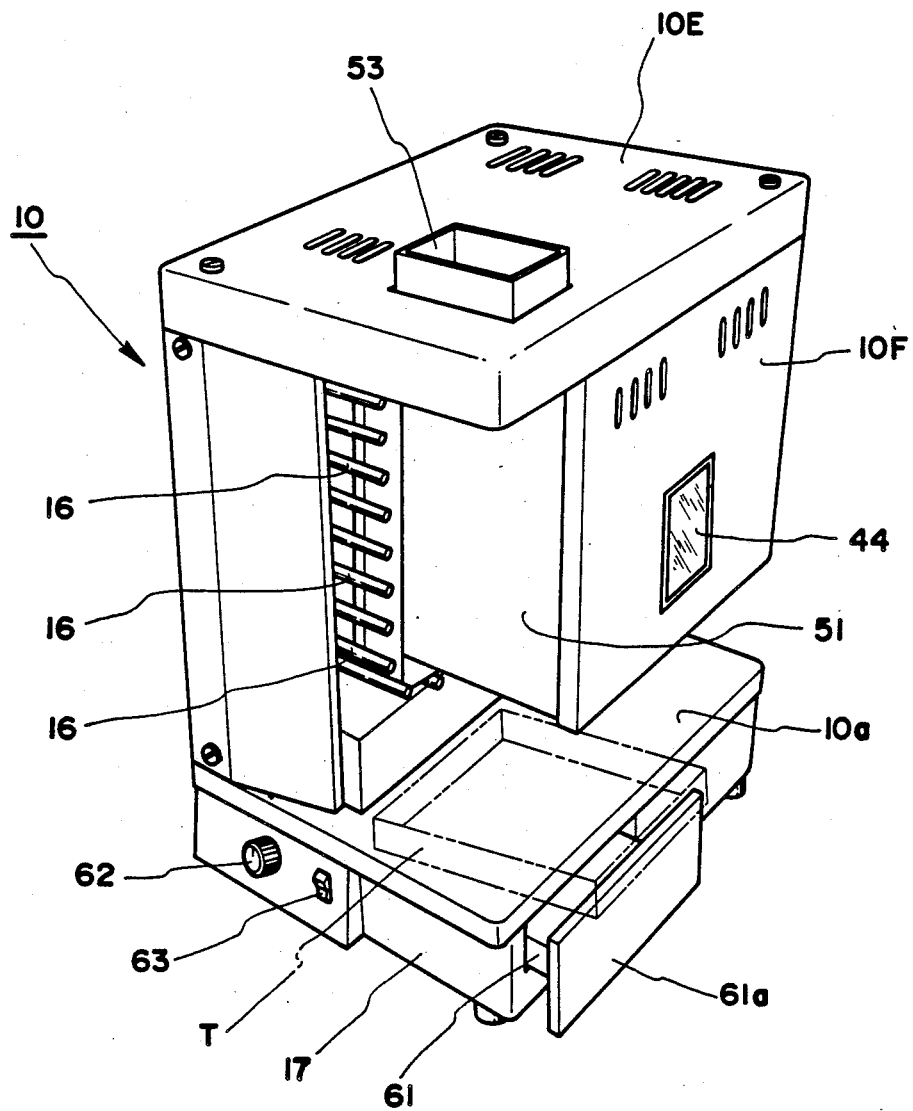
FIG. 1 is an overall perspective view of an automatic skewered food roaster according to the present invention.

A preferred embodiment of the present invention will be described hereunder with reference to the accompanying drawings, in which like reference numerals denote like parts throughout several sheets.

Figure 2:
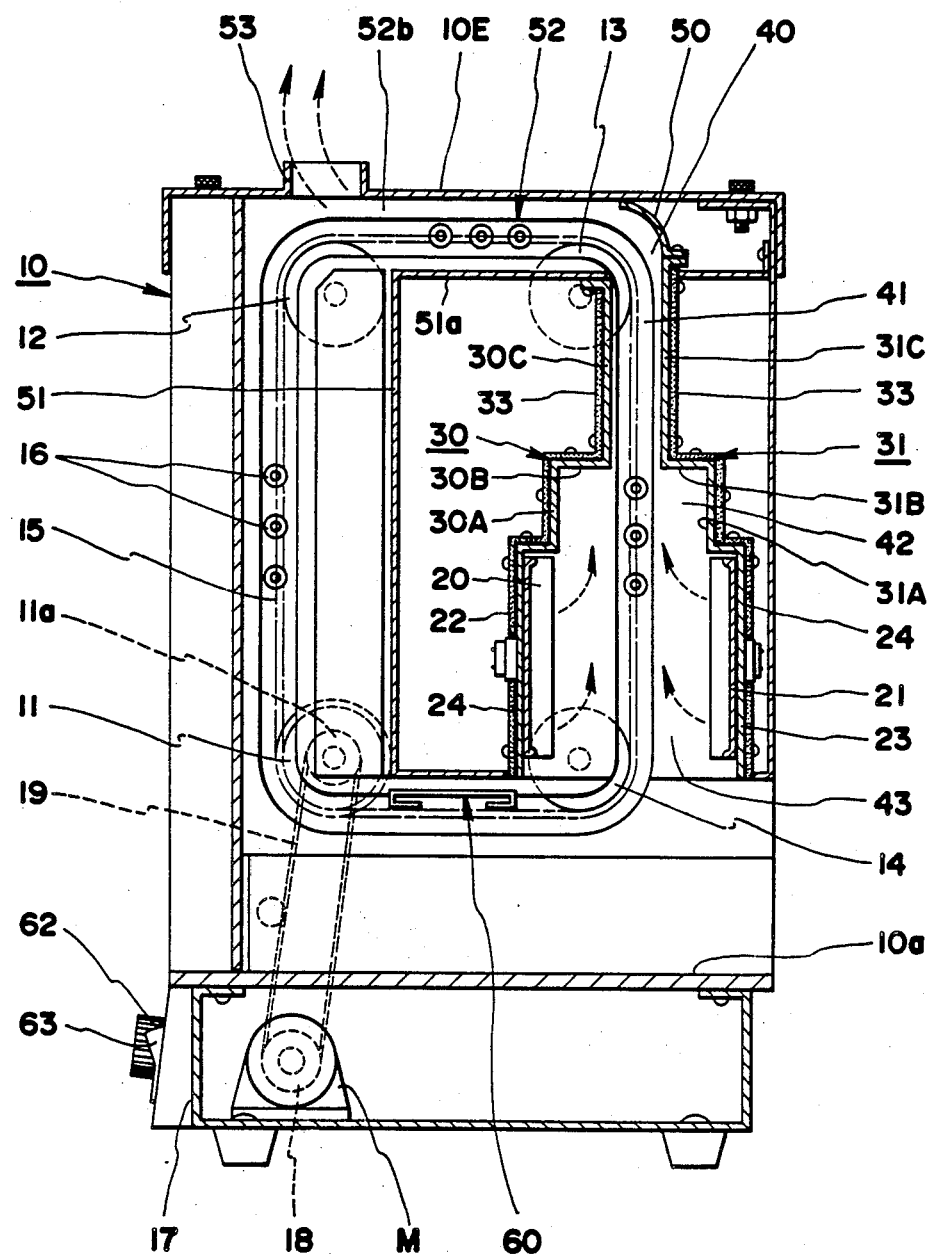
FIG. 2 is a side sectional view showing the internal construction thereof.
Figure 3:
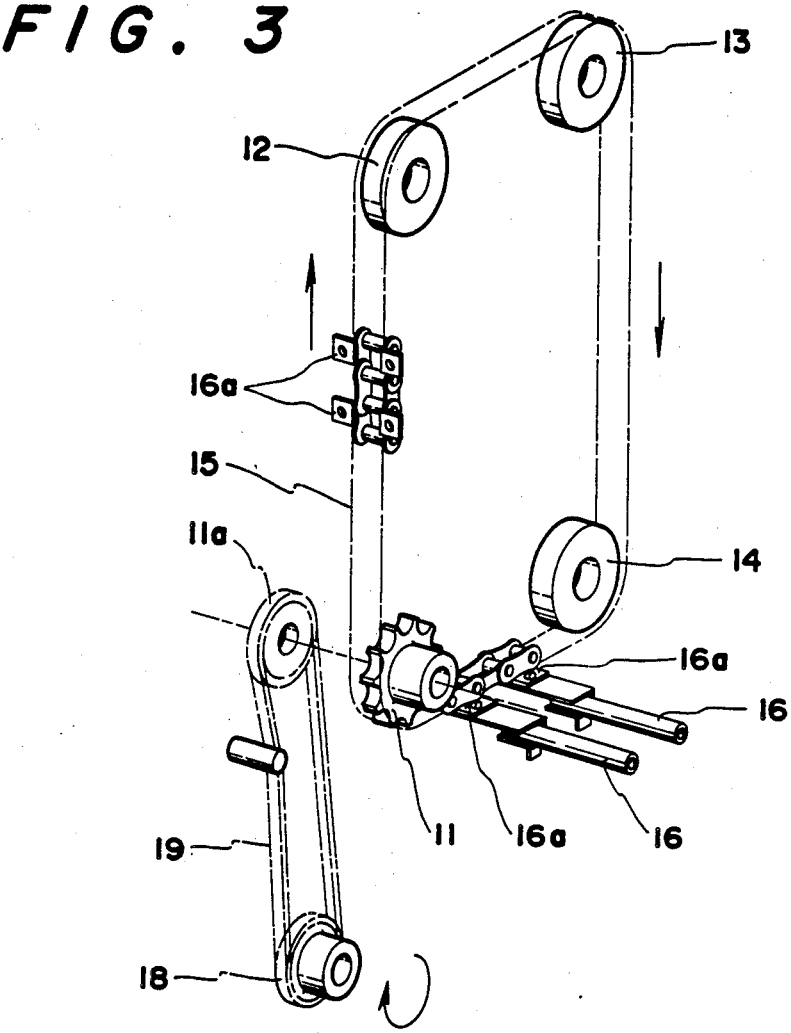
FIG. 3 is a perspective view, partly omitted, of the construction of an endless chain portion.

In the drawings, FIG. 1 illustrates an overall perspective view of an automatic skewered food roaster according to the present invention, and FIG. 2 illustrates a side sectional view of the internal construction thereof. A skewered food roaster generally designated by reference numeral 10 is provided with side walls as well as ceiling and bottom walls thereof. Internally of roaster 10 are driving sprocket 11 and wheels 12, 13 and 14. Looped around the driving sprocket 11 and wheels 12 through 14 is an endless chain 15. The endless chain 15 has spacedly mounted thereon a number of skewered food holding pipes 16 horizontally projecting inwardly of the skewered food roaster 10. Reference numeral 16a denotes a bracket for mounting the pipes 16. Driving sprocket 11 is shown in FIG. 3. Coaxially mounted with respect to the driving sprocket 11 is a pulley 11a. Looped around the pulley 11a and driving pulley 18 is a transmission belt 19. Motor M mounted within case 17 drives pulley 18 and through belt 19 pulley 11a. When the motor M is driven, the endless chain 15 is moved in a clockwise direction as shown by the arrows in FIG. 3. The three wheels 12, 13 and 14 merely serve as guide wheels for the endless chain 15.

Figure 6:
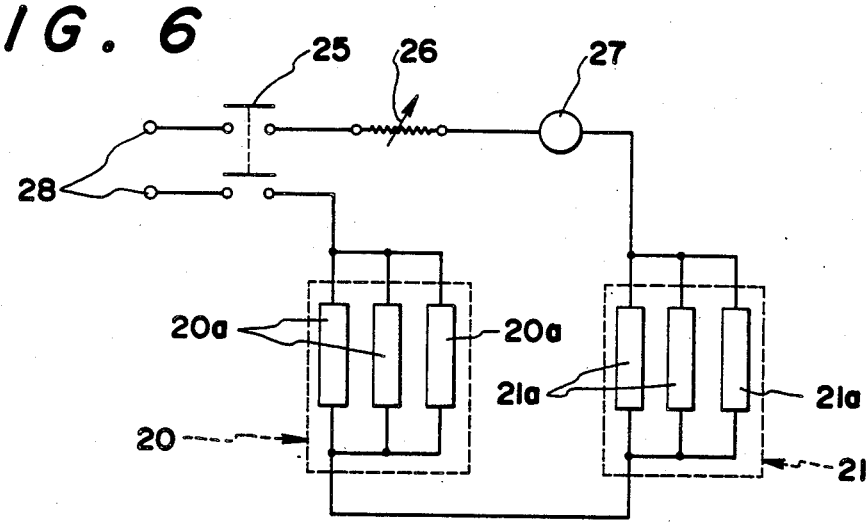
FIG. 6 is a power circuit of an infrared heater according to the present invention.

Reference numerals 20 and 21 denote infrared heater portions. The infrared heater portions are arranged vertical opposite each other, with a part of the endless chain passing therebetween. These heater portions 20 and 21, as shown for example in the circuit in FIG. 6, each comprises a plurality of infrared heaters (three pieces in this embodiment) 20a made of a ceramic material. The heater portions 20 and 21 are connected to a power source 28 for a heater through an on-off switch 25, a variable resistor (adjusting dial) 26 for adjusting the temperature, and an on-off indication lamp 27. The heater portions 20 and 21 are wholly accommodated in heater casings 22 and 23 with the front surfaces thereof opened, respectively, and the outsides of the casings 22 and 23 covered with insulating materials 24, respectively. With the foregoing state, the heater portions 20 and 21 are disposed at one side within the roaster 10.

Figure 4:
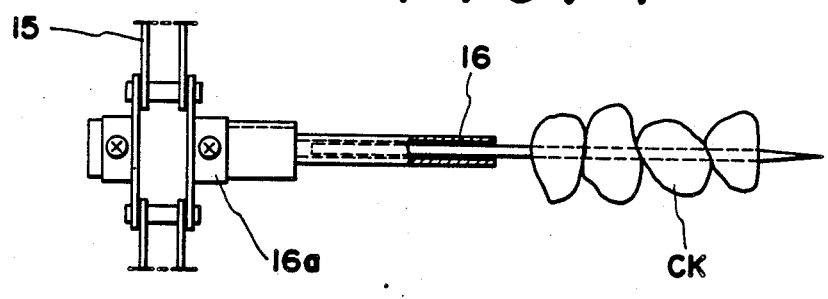
FIG. 4 is a side view of a skewer holding pipe, into which a skewer holding skewered food is inserted.
Figure 5:
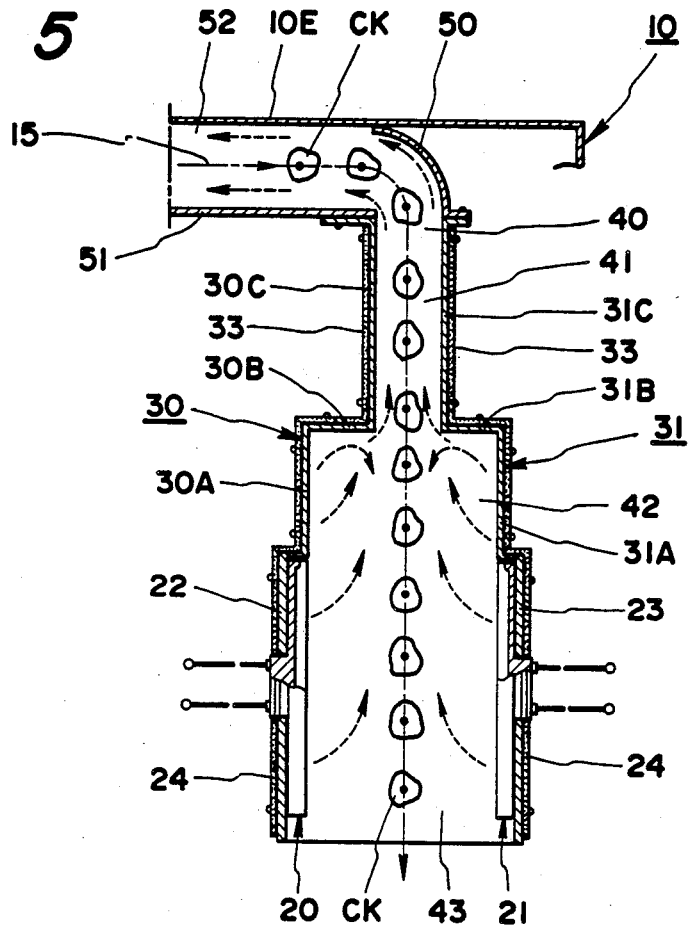
FIG. 5 is an enlarged sectional view showing a portion material to the present invention.

Reference numerals 30 and 31 generally denote right and left heat reserving plates disposed opposite to each other at the respective upper portions of the right and left infrared heater portions 20 and 21, with the passage for the endless chain 15 defined therebetween. As shown in FIGS. 2 and 5, the heat reserving plates 30 and 31 as a whole comprise vertical portions 30A, 31A, horizontal portions 30B, 31B and vertical portions 30C, 31C. Portions 30B and 31B are each formed by bending at the upper end portion at right angles toward the passage for the endless chain 15 mounting leg portions 30A and 31A vertically upwardly extending from the upper portions of the infrared heater portions 20 and 21, and vertical portions 30C and 31C each formed by bending again the tip side of each of the horizontal portions at right angles upwardly, so that the vertical portions 30C and 31C are disposed closer to and in parallel to the passage for the endless chain 15. The external surfaces of the heat reserving plates 30 and 31 are covered with an insulating material 33. The upper end opening defined by the vertical portions 30C and 31C serves as an inlet for the endless chain 15, and the narrow space between the vertical portions 30C, 31C serves as a heat reserving chamber 41. Similarly, the space between the leg portions 30A and 31A and including the horizontal portions 30B and 31B serves as a heat storage chamber 42 and functions as a second heat reserving chamber. Furthermore, the space formed between the right and left infrared heater portions 20 and 21 serves as a roasting chamber 43. As shown in FIG. 4, the skewer holding skewered chicken CK is inserted in the respective skewer holding pipes 16 on the endless chain 15 and transferred by the endless chain 15 from the inlet 40, through the heat reserving chamber 41 and heat storage chamber 42, to the roasting chamber 43. During the foregoing process, the skewered chicken CK is sufficiently roasted. In FIG. 1, reference numeral 44 denotes an observation window formed in a front plate 10F of the roaster 10 and formed of a heat resisting glass. Through this observation window 44, the roasting state of the chicken on the skewer CK within the roasting chamber 43 can be observed.

In FIG. 2 and FIG. 5, reference numeral 50 denotes a guide plate mounted on the upper end portion of the elongated right side heat reserving plate 31. A preheating chamber 52 surrounding the horizontal upper passage for the endless chain comprises the guide plate 50, a ceiling plate 10E of the roaster 10, and a ceiling plate 51a of a partition plate 51 disposed within the roaster 10. Hot air and smoke ascendeing from the inlet 40 through the heat reserving plates 30 and 31 pass along the guide plate 50 and flow into the preheating chamber 52. Thereafter, the hot air and smoke are discharged from a discharge port 53 formed in the upper ceiling plate 10E of an inlet port 52b of the preheating chamber 52.

In FIG. 2, reference numeral 60 generally denotes a skewer removing device. The skewered chicken CK roasted between the infrared heater portions 20 and 21 is automatically removed from the skewer holding pipes 16 by the skewer removing device 60 and dropped in a suitable container on a receiving plate 10a. Since the skewer removing device 60 herein used is prior art, its specific construction will not be described.

In FIG. 1, reference numeral 61 denotes a preliminary table withdrawably disposed on the receiving plate 10a of the roaster 10. A container T is placed at an angle, as shown in FIG. 1, on a front plate 61a of the table 61, so that roasted skewered chicken CK removed by the skewer removing device 60 may be received therein. Similarly, reference numeral 62 denotes an adjusting dial for the motor M, and reference numeral 63 denotes an on-off switch.

With the foregoing construction of an automatic skewered food roaster according to the present invention, hot air generated from the infrared heaters 20 and 21 ascends, as shown by arrows in FIG. 5, from the roasting chamber 43 to the storage chamber 42, turns its direction after hitting the horizontal portions 30B and 31B, and is retained in the storage chamber 42, thereby increasing the temperature within the storage chamber 42. Then, the hot air after passing through the storage chamber 42 is ascends through the narrow heat reserving chamber 41 between the vertical portions 30C and 31C, flows into the preheating chamber 52 from the inlet 40 guided by the guiding plate 50, and finally discharges outside through the discharge port 51 of the roaster 10. In this connection, when the temperature within the roasting chamber 43 is adjusted, for example, to 200° C., the temperature within the storage chamber 42 becomes approximately 250° to 280°. The temperature within the narrow heat reserving chamber 41 goes up 300° maximum. Similarly, the temperature within the preheating chamber 52 is 200° C. or less.

As described in the foregoing, in an automatic skewered food roaster according to the present invention, raw chicken secured to the skewers and transferred by the endless chain 15 is thawed in the preheating chamber, heated to a half raw state in the heat reserving chamber and then transferred to a space between the infrared heaters through the storage for roasting. Because of the foregoing construction, the skewered chicken can be sufficiently roasted deep into the center core thereof. Especially, since infrared heaters are employed as a heat source in the present invention, the skewered food roaster according to the invention is safe compared with the conventional devices in which a gas is employed as a power source. Besides, installation of the present invention is extremely easy. Furthermore, since horizontal portions are formed in the middle portion of the heat reserving plate for turning and storing ascending heat, the ascending heat generated from the right and left infrared heaters is reserved therein, so that the skewered chicken can be effectively heated. Furthermore, since the vertical portions extending from the horizontal portions have a narrow space defined therebetween, the ascending heat is concentrated in this space, thereby further increasing the heat-reserving effect. Because of the foregoing, the skewered chicken transferred from above can be heated at higher temperature than the roasting temperature by the infrared heaters for a comparatively long time. As a result, the skewered chicken is prepared in a completely half raw state by the preheating in the preheating chamber and the heating by the heat storing chamber prior to roasting. Thus, the present invention has the advantages that meat juice is not dropped outside, roasting time is shortened, and heating temperature of the infrared heaters can be adjusted to a low level.

From the foregoing it will be seen that a novel and efficient automatic skewered food roaster has been described herein. The descriptive and illustrative materials employed herein are utilized for purposes of exemplifying the invention and not in limitation thereof. Accordingly, numerous modifications of the present invention will occur to those skilled in the art without departing from the spirit and scope of the invention. Moreover, it is to be understood that certain features of the present invention can be used to advantage without a corresponding use of other features thereof.

What is claimed is:

1. An automatic skewered food roaster comprising a roaster housing, vertically disposed spaced facing infrared heaters mounted within said housing, a moveable endless chain mounted within said housing and passing between said heaters for transferring spaced skewered food in a clockwise direction and spaced heat reserving plates disposed outside of said heaters within said housing, said heat reserving plates extending above said heaters and defining horizontal sections extending towards each other and vertical sections extending above said horizontal sections to form a path for said endless chain and a chamber serving as a heat storage for reflecting and storing heat ascending from said infrared heaters.

2. The automatic skewered food roaster according to claim 1, wherein said infrared heaters are made of a ceramic material.

* * * * *